Patented Jan. 7, 1936

2,026,748

UNITED STATES PATENT OFFICE 2,026,748

AR-N-(NITRO-PHENYL)-TETRAHYDRO-NAPHTHYLAMINES AND PROCESS OF PREPARING SAME

Henry Charles Olpin, Spondon, near Derby, England, assignor to Celanese Corporation of America, a corporation of Delaware No Drawing. Application January 25, 1930, Serial No. 423,546. In Great Britain March 12, 1929

5 Claims. (Cl. 260—128)

This invention relates to the manufacture of new dyestuffs and the application thereof and more particularly their application to materials made of or containing cellulose acetate or other cellulose esters or ethers.

The new dyestuffs of the present invention are prepared by condensing ar-tetrahydro-α- or β-naphthylamine, or derivatives thereof, with nitrated aromatic compounds containing one or more labile halogen atoms. For convenience the new dyestuffs will be termed N-nitro-aryl-ar-tetrahydro-α- or β-naphthylamines whether they are obtained from the naphthylamine itself or a derivative thereof.

The new dyestuffs have in general greenish-yellow to yellow-brown shades and are especially of value for the dyeing or otherwise colouring of materials made of cellulose acetate or other cellulose esters or ethers, for example cellulose formate, propionate or butyrate or the products obtained by the treatment of alkalized cellulose with esterifying agents, e. g. the product known as "immunized cotton" obtained with p-toluene sulpho-chloride, or methyl, ethyl or benzyl cellulose or the like or containing cellulose esters or ethers mixed with other fibres. For this purpose the dyestuffs should not contain more than one sulphonic group.

As examples of suitable nitro aromatic compounds which may be condensed with the ar-tetrahydro-α- or β-naphthylamines the following may be mentioned:—

2.4-dinitro-chlor-benzene
2-nitro-chlor-benzene
2-nitro-brom-benzene
2.5-dichlor-nitro-benzene
2.4-dinitro-chlor-benzene-6-sulphonic acid
2.4-dinitro-chlor-benzene-6-carboxylic acid The following are some examples of dyestuffs which may be prepared and applied according to the present invention:—

| Dyestuff | Shade on cellulose acetate |
|---|---|
| Ar-N-(2:4-dinitro-phenyl)-tetrahydro-α-naphthylamine. | Pure yellow. |
| Ar-N-(2:4-dinitro-phenyl)-tetrahydro-β-naphthylamine. | Bright greenish yellow. |
| Ar-N-(2-Nitro-4-chlor-phenyl)-tetrahydro-β-naphthylamine. | Golden yellow. |
| Ar-N-(2:4-dinitro-6-sulpho-phenyl)-tetrahydro-α-naphthylamine. | Pure yellow. |

Similar shades are obtained by using the mono alkyl or mono acetyl derivatives of the tetrahydro-naphthylamines.

For the purpose of dyeing cellulose esters or ethers the dyestuffs where sufficiently soluble may be applied in the form of their aqueous solutions or in the form of aqueous solutions of their salts. In so applying them any of the usual assistants may be employed. If insufficiently soluble, the dyestuffs may be applied from aqueous suspensions or dispersions prepared by any suitable methods. Dispersions may, for example, be obtained by grinding in the so-called colloid mills, by dissolving in a solvent and mixing with water containing or not containing dispersators or protective colloids or by treatment with dispersators for example in the manner described in prior U. S. Patents Nos. 1,618,413, 1,618,414, 1,694,413, 1,690,481, 1,716,721, 1,803,008, 1,840,572 and 1,928,647 and British Patent No. 323,788. The compositions of matter containing the relatively water insoluble dyestuffs and a dispersator and/or a protective colloid are included in the present invention.

The following examples show the best methods known to us for carrying the invention into effect, but they are of course not intended to limit the invention in any way:—

*Example 1*

147 parts of ar-tetrahydro-α-naphthylamine are dissolved in 1000 parts of methylated spirit, 202 parts of 2:4-dinitro-chlorbenzene and 82 parts of anhydrous sodium acetate are added, and the whole boiled under reflux for 1–1½ hours. On cooling to normal temperature the dyestuff crystallizes out in a very good state of purity. On recrystallizing from methylated spirits the dyestuff, ar-N-(2:4-dinitro-phenyl)-tetrahydro-α-naphthylamine, is obtained as bright orange-red crystals, melting point 127–128° C. (uncorrected), and having the formula

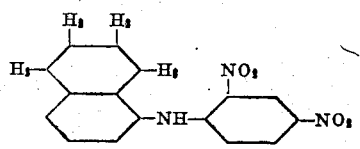

*Example 2*

10 parts of ar-tetrahydro-β-naphthylamine, 13 parts of 2:5-dichlor-nitro-benzene and 4 parts of soda ash are heated under reflux with stirring at 120–125° C. for 10–15 hours. The melt is then cooled, steam distilled to drive off any unchanged tetrahydro-β-naphthylamine and dichlor-nitro-benzene, and the residue crystallized from methylated spirit. The dyestuff, ar-N-(2:nitro-4-chlor-phenyl)-tetrahydro-β-naphthylamine, is thus obtained as red-brown crystals, melting point 124–125° C. (uncorrected), and having the probable formula

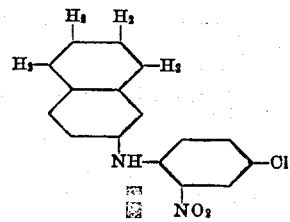

*Example 3*

To dye a bright greenish yellow shade on 10 kilos of cellulose acetate yarn in hank form:—

100 grams of ar-N-(2:4-dinitrophenyl)-tetrahydro-β-naphthylamine are ground to a fine powder, and stirred into 500 grams of the sulpho-aromatic fatty acid product prepared according to Example A in United States Patent No. 1,694,413. The mixture is heated until the maximum degree of dispersion is achieved, then diluted with boiling water and added through a sieve into a dye bath containing 300 litres of water. The goods are now entered and processed, the temperature being raised in the usual manner until the desired shade is achieved. The goods are now lifted, rinsed, and dried or otherwise treated as requisite.

*Example 4*

To dye a bright yellow on 10 kilos of cellulose acetate knit fabric:—

200 grams of the product ar-N-(2:4-dinitro-6-sulpho-phenyl)-tetrahydro-α-naphthylamine are dissolved in 300 litres of water at 50–60° C. and the goods entered. The temperature is slowly raised to 80° C. and the fabric processed at this temperature till the desired shade is achieved. The goods are now lifted, rinsed and dried or otherwise treated as requisite.

The term "nitro-phenyl" as used in the claims is to be understood as including phenyl radicles containing other substituent groups or atoms, as for example chlorine, in addition to nitro groups, as well as phenyl radicles in which nitro groups are the only substituent groups.

What I claim and desire to secure by Letters Patent is:—

1. Process for the production of new dyestuffs, comprising condensing a compound selected from the group consisting of ar-tetrahydro-α- and β-naphthylamines and their mono-alkyl and mono-acetyl nuclear substitution derivatives with a nitrated aromatic compound of the benzene series containing at least one labile halogen atom.

2. Process for the production of new dyestuffs comprising condensing an unsulphonated compound selected from the group consisting of ar-tetrahydro-α- and β-naphthlyamines and their mono-alkyl and mono-acetyl nuclear substitution derivatives with a nitrated aromatic compound of the benzene series containing at least one labile halogen atom.

3. Process for the production of new dyestuffs comprising condensing an ar-tetrahydro naphthylamine with a nitrated aromatic compound of the benzene series containing at least one labile halogen.

4. Process for the production of new dyestuffs comprising condensing an unsulphonated ar-tetrahydro naphthylamine with a nitrated aromatic compound of the benzene series containing at least one labile halogen.

5. Ar-N-(nitro-phenyl)-tetrahydro-naphthylamines.

HENRY CHARLES OLPIN.